United States Patent
Zarkowskyj

(10) Patent No.: US 11,873,669 B2
(45) Date of Patent: Jan. 16, 2024

(54) SINGLE RELEASE LATCHING SYSTEM WITH MULTIPLE INDEPENDENTLY LATCHING LATCH ASSEMBLIES

(71) Applicant: The Boeing Company, Chicago, IL (US)

(72) Inventor: Peter J. Zarkowskyj, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 17/568,210

(22) Filed: Jan. 4, 2022

(65) Prior Publication Data

US 2022/0228407 A1    Jul. 21, 2022

Related U.S. Application Data

(60) Provisional application No. 63/137,939, filed on Jan. 15, 2021.

(51) Int. Cl.
    *E05C 9/02* (2006.01)
    *E05C 9/22* (2006.01)
    (Continued)

(52) U.S. Cl.
    CPC ............ *E05C 9/028* (2013.01); *E05C 9/10* (2013.01); *E05C 9/1883* (2013.01); *E05C 9/22* (2013.01)

(58) Field of Classification Search
    CPC ......... Y10T 292/0853; Y10T 292/0857; Y10T 292/0848; Y10T 292/0849;
    (Continued)

(56) References Cited

U.S. PATENT DOCUMENTS 1,065,172 A * 6/1913 Riggs ............... B65D 45/28
                                                292/52
1,469,590 A * 10/1923 Palmer .............. E05C 9/02
                                            292/DIG. 32
(Continued)

FOREIGN PATENT DOCUMENTS

CN     599437 A5 * 10/1975 ......... E05B 15/0245
DE  3712666 A1 *  4/1987 ............. E05C 3/042
(Continued)

*Primary Examiner* — Kristina R Fulton
*Assistant Examiner* — Steven A Tullia
(74) *Attorney, Agent, or Firm* — Quinn IP Law

(57) ABSTRACT

A latching system includes a guide body, and a latch rod slidably retained by the guide body. Latch assemblies fixed to the latch rod, are spaced apart from one another, and independently biased to a latched position. A first rod-biasing spring is coaxial with the latch rod and disposed between the guide body and a first latch assembly. The first rod-biasing spring biases the latch rod to a rest position corresponding with a latched position of the latch assemblies. Multiple catches are secured at a spacing equal to a spacing of the latch assemblies on the latch rod such that the latch assemblies latch to the catches independently of one another. A force on the latch rod against the first rod-biasing spring moves the latch rod along the longitudinal axis of the latch rod from a rest position to an actuated position and unlatches the latch assemblies simultaneously.

20 Claims, 14 Drawing Sheets

(51) Int. Cl.
  *E05C 9/18*   (2006.01)
  *E05C 9/10*   (2006.01)

(58) Field of Classification Search
  CPC .......... Y10T 292/0859; Y10T 292/086; Y10T 292/1051; Y10T 292/1052; Y10T 292/106; Y10T 292/1061; Y10T 292/0867; E05C 9/028; E05C 9/10; E05C 9/1883; E05C 9/02; E05C 9/22; E05B 9/08; E05B 15/0245; Y10S 292/51
  See application file for complete search history.

(56) References Cited

U.S. PATENT DOCUMENTS

| | | | | | |
|---|---|---|---|---|---|
| 1,529,085 | A | * | 3/1925 | Preble | E05C 9/02 292/195 |
| 1,614,046 | A | * | 1/1927 | Schmidgall | E05B 15/0245 292/341.18 |
| 1,809,804 | A | * | 6/1931 | Rider | G09F 7/00 292/254 |
| 1,913,986 | A | * | 6/1933 | Harward | E05B 15/0245 292/341.18 |
| 2,146,700 | A | * | 2/1939 | Peterson | E05B 83/247 292/240 |
| 2,592,274 | A | * | 4/1952 | Groeger | E05B 15/0245 292/332 |
| 2,710,217 | A | * | 6/1955 | Curtiss, Jr. | E05B 15/0245 292/341.18 |
| 2,749,169 | A | * | 6/1956 | Johnson | E05B 65/0042 292/201 |
| 2,831,718 | A | * | 4/1958 | Hallek | B60J 7/1851 296/120.1 |
| 3,026,132 | A | * | 3/1962 | Korab | E05B 83/247 292/DIG. 14 |
| 3,656,789 | A | * | 4/1972 | Ray | E05C 19/00 292/205 |
| 4,009,537 | A | * | 3/1977 | Hubbard | E05B 65/1066 49/366 |
| 4,273,368 | A | * | 6/1981 | Tanaka | E05B 83/16 292/DIG. 43 |
| 4,493,499 | A | * | 1/1985 | Stenglein | E05C 9/02 292/DIG. 57 |
| 4,643,005 | A | * | 2/1987 | Logas | E05C 9/026 70/95 |
| 4,784,414 | A | * | 11/1988 | Free | E05C 9/08 292/52 |
| 4,838,054 | A | * | 6/1989 | Weinerman | E05B 9/08 292/DIG. 31 |
| 4,973,091 | A | * | 11/1990 | Paulson | E05C 9/042 292/216 |
| 5,491,993 | A | * | 2/1996 | Anderson | E05C 3/042 70/369 |
| 5,630,630 | A | * | 5/1997 | Price | E05B 83/30 292/336.3 |
| 5,775,749 | A | * | 7/1998 | Reithmeyer | E05B 65/08 292/DIG. 46 |
| 6,802,543 | B1 | * | 10/2004 | Wakefield | E05B 13/002 292/26 |
| 11,408,212 | B2 | * | 8/2022 | Krause | E05C 9/185 |
| 2004/0140678 | A1 | * | 7/2004 | Linares | E05C 3/24 292/216 |
| 2005/0099019 | A1 | * | 5/2005 | Hall | E05C 3/162 292/304 |
| 2009/0108591 | A1 | * | 4/2009 | De Vries | E05B 15/0245 292/64 |
| 2010/0117384 | A1 | * | 5/2010 | Cole | E05C 9/02 292/341.15 |
| 2010/0244641 | A1 | * | 9/2010 | Bergesch | E05C 9/048 292/195 |
| 2014/0252784 | A1 | * | 9/2014 | Krueger | E05B 47/0012 292/229 |
| 2014/0353989 | A1 | * | 12/2014 | Nelson | E05B 15/0245 292/341.18 |
| 2016/0201364 | A1 | * | 7/2016 | Starman | E05B 15/0086 292/108 |
| 2019/0153747 | A1 | * | 5/2019 | Ward | E05C 3/08 |
| 2022/0228407 | A1 | * | 7/2022 | Zarkowskyj | E05C 9/10 |

FOREIGN PATENT DOCUMENTS

| | | | | |
|---|---|---|---|---|
| DE | 9216214 | U1 * | 11/1992 | ......... E05B 15/0245 |
| DE | 202009004463 | U1 * | 7/2009 | ............. E05C 9/185 |
| DE | 102011050226 | A1 * | 11/2011 | ............. E05C 9/006 |
| EP | 0498025 | A2 * | 5/1991 | ........... E04B 2/7425 |
| FR | 3066221 | B1 * | 7/2020 | ............. E05C 3/042 |
| WO | WO-9837295 | A1 * | 8/1998 | ......... E05B 15/0245 |
| WO | WO-2006096600 | A2 * | 9/2006 | ............. E05B 83/30 |
| WO | WO-2010010232 | A1 * | 1/2010 | ........... E04B 2/7425 |
| WO | WO-2010123038 | A1 * | 10/2010 | ........... E05B 15/024 |
| WO | WO-2018048442 | A1 * | 3/2018 | ......... E05B 63/0056 |

* cited by examiner

SINGLE RELEASE LATCHING SYSTEM WITH MULTIPLE INDEPENDENTLY LATCHING LATCH ASSEMBLIES

CROSS-REFERENCE TO RELATED APPLICATION

The present application claims the benefit of priority to U.S. Provisional Application No. 63/137,939 filed Jan. 15, 2021, which is hereby incorporated by reference in its entirety.

TECHNICAL FIELD

The disclosure relates to a latching system, such as a latching system to latch a closure panel to a compartment structure, with multiple latching assemblies that latch independently of one another but release simultaneously.

BACKGROUND

Certain closure panels are relatively large and have more than one latch assembly in order to secure the closure panel to a structure. With known latching systems having multiple latch assemblies, the latch pawls do not latch independently. However, it can be difficult to get all of the latch assemblies to latch at once when closing the closure panel. For example, an amenity door in an airplane lavatory may be hinged to a compartment structure and latch to the structure when pivoted to a closed position. Such doors are typically lightweight. As such, depending upon where the closing force is applied to the door, it is difficult to get all of the latch assemblies to latch. If one does not latch, the closure process must start over by unlatching the entire system and applying the closure force again to attempt to achieve a simultaneous latching event. This causes delay, and may lead to a tendency for the operator to slam the door in an effort to latch all of the latch assemblies simultaneously.

SUMMARY

A latching system is provided that enables efficient and reliable latching and release of multiple latch assemblies. The multiple latch assemblies of each of the latching systems provided herein can latch independently of one another to lock a closure panel to a compartment structure and yet still be released simultaneously to unlock the closure panel. Accordingly, if one of the latch assemblies does not latch in response to the closing action, the operator can simply push against the portion of the closure panel where a latch assembly did not latch to cause it to move into a latched position without having to first release those of the latch assemblies that did successfully latch.

In an example, a latching system for latching a first structure to a second structure includes a guide body configured to be secured to the second structure, and a latch rod slidably retained by the guide body. Multiple latch assemblies are fixed to the latch rod, are spaced apart from one another, and are independently biased to a latched position. A first rod-biasing spring is coaxial with the latch rod and is disposed between the guide body and a first of the latch assemblies. The first rod-biasing spring biases the latch rod to a rest position corresponding with a latched position of the latch assemblies. Multiple catches are configured to be secured to the first structure so that they are spaced apart from one another at a spacing equal to a spacing of the multiple latch assemblies on the latch rod such that the latch assemblies latch to the catches independently of one another. A force on the latch rod along a longitudinal axis of the latch rod in a direction against the first rod-biasing spring moves the latch rod along the longitudinal axis of the latch rod from a rest position to an actuated position and unlatches the multiple latch assemblies simultaneously.

In an example, each of the latch assemblies may include a latch body fixed to the latch rod, a latch pawl connected to the latch body and pivotable relative to the latch body between a latched position and an unlatched position. The latch pawl of each of the latch assemblies is pivotable independently of the latch pawl of each other latch assembly. A biasing member may bias the latch pawl to the latched position. The biasing member may be a torsion spring. The latch pawl may have a notch, and an end of the torsion spring may be seated in the notch.

An actuator may be attached to the latch rod and adapted to receive a force to move the latch rod along the longitudinal axis of the latch rod against the first rod-biasing spring from the rest position to an actuated position. For example, the actuator may be a push pad or a lever disposed near an end of the latch rod, such as near a lower end in an embodiment where the latch rod is oriented with its longitudinal axis vertical, and the actuator may be configured to be foot operated. A bracket may be secured to the actuator. A lock nut may be secured to the latch rod adjacent to a second of the latch assemblies. The latch rod may extend through the bracket between the second of the latch assemblies and the lock nut. The actuator may be a lever with a slot and the latch rod may extend through the slot. Pivoting the lever may apply the force to the latch rod via the lever pushing against the latch body of the second latch assembly to move the latch rod to the actuated position The latch rod may be biased to the rest position by the rod-biasing spring. For example, a lock nut may be secured to the latch rod adjacent to a first of the latch assemblies and may be adjusted along the latch rod to a position at which it preloads the first rod-biasing spring to bias the latch rod to the rest position, causing the latch rod to return to the rest position when the force applied on the latch rod to unlatch the latch assemblies (e.g., a force applied on the latch rod via the actuator) is removed. A second rod-biasing spring may also be coaxial with the latch rod and act against a second of the latch assemblies.

The latching system may have additional features that help to ensure proper alignment of the closure panel with the compartment structure to aid in proper operation of the multiple latch assemblies. For example, the latching system may include a bracket having a body securable to the first structure (e.g., the closure panel), and having a guide pin configured to extend outward from the body of the bracket. A guide receptacle may be configured to receive the guide pin when the first structure is closed to establish a relative orientation of the first structure and the second structure in the direction along the longitudinal axis of the latch rod. The guide receptacle may be integral with the guide body in some embodiments. Additionally, in some embodiments, the orientation of the guide pin on the first structure may be adjusted to ensure that the guide pin is received in the guide receptacle. This enables greater manufacturing tolerances and avoids alignment issues that may be exacerbated if the first structure has a propensity to sag over time. In an example, the bracket may have an elongated slot extending therethrough, a plurality of first serrations disposed at an inner side of the bracket (either integral on an inner face of the bracket or on a plate secured to the inner face of the bracket), and the latching system may further include a serrated plate configured to secure to the first structure and having a plurality of second serrations configured to interlock with the plurality of first serrations. A set screw may be configured to extend through the elongated slot to the serrated plate. The relative orientation of the first structure and the second structure is thus adjustable along a length of the elongated slot by engaging the first serrations with the second serrations at different relative orientations. Once the correct relative orientation is determined that aligns the guide pin with the guide receptacle, the relative orientation is set by tightening the set screw against the serrated plate.

The latching system may also include features that prevent latch bodies of the latch assemblies from inadvertently rotating relative to the latch rod in order to maintain proper alignment of the latching features disposed at the second structure (e.g., the compartment structure) with those disposed at the first structure (e.g., catches on the closure panel). For example, a base may extend parallel with the latch rod and may be configured to be secured to the second structure. The base may interfere with inner sides of the multiple latch assemblies upon a rotational force applied to the latch rod to limit rotation of the latch rod about the longitudinal axis of the latch rod. In another example, at least a portion of the latch rod may have a non-circular perimeter, and the guide body may have an opening through which the latch rod extends. The opening may have a shape that interferes with the non-circular perimeter of the latch rod upon a rotational force applied to the latch rod to limit rotation of the latch rod about the longitudinal axis of the latch rod, thus keeping the latch bodies fixed to the latch rod in a predetermined orientation to better ensure desired latching of the latch pawls to the catches on the closure panel.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Disclosed herein are various embodiments of latching systems that enable independent latching of multiple latch assemblies yet simultaneous release of the latching assemblies in response to a single release action. The ability of the latch assemblies to latch independently from one another is particularly useful in the event that one of the latch assemblies successfully latches in response to a closing force on the closure panel while another of the latch assemblies does not because an operator can simply push the closure panel at the unlocked latch assembly and the unlocked latch assembly will lock without disrupting the already locked latch assembly. In this manner, the latch assemblies may be referred to as being decoupled from one another.

Figure 1:
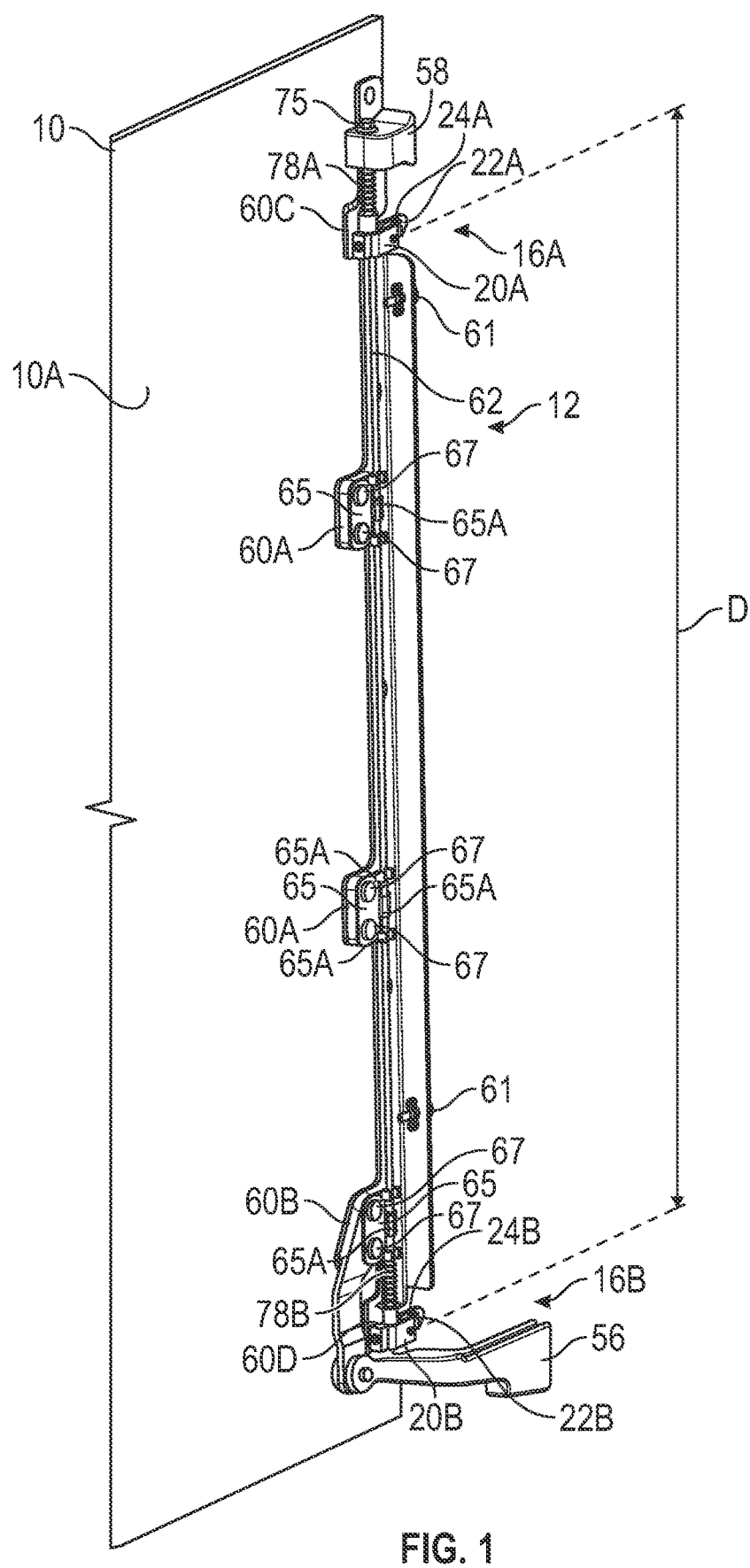
FIG. 1 is a fragmentary view of a compartment structure and showing a portion of a first embodiment of a latching system with multiple latch assemblies in a latched position and an actuator shown in a rest position.
Figure 4:
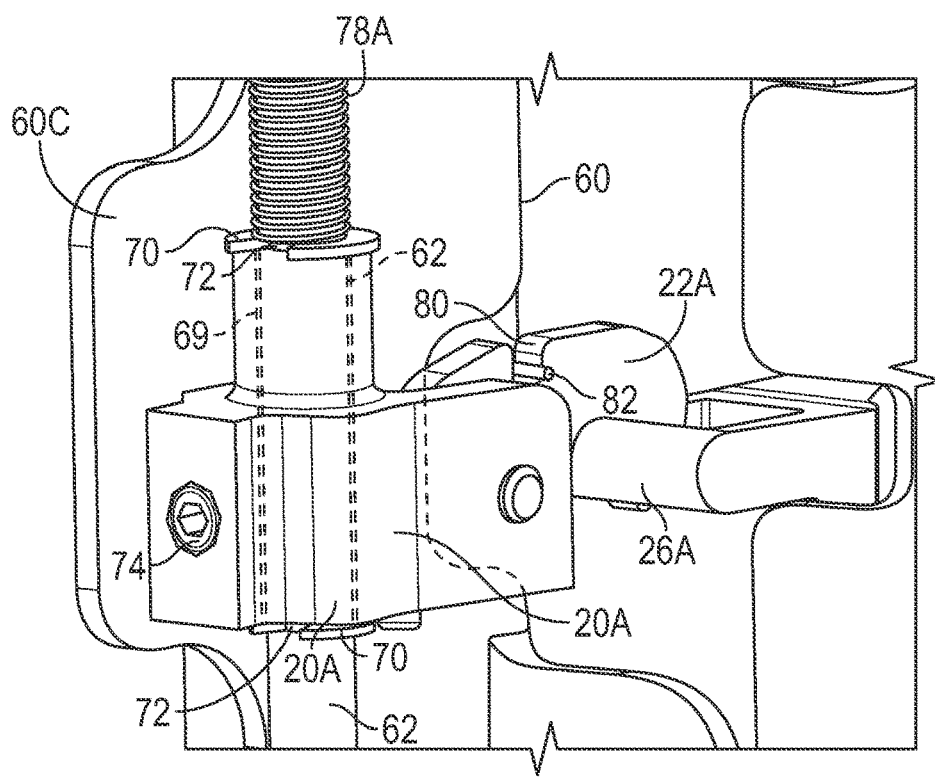
FIG. 4 is a fragmentary perspective view of the compartment structure and the portion of the latching system of FIG. 1, showing the latch pawl latched to a catch extending from a closure panel.
Figure 5:
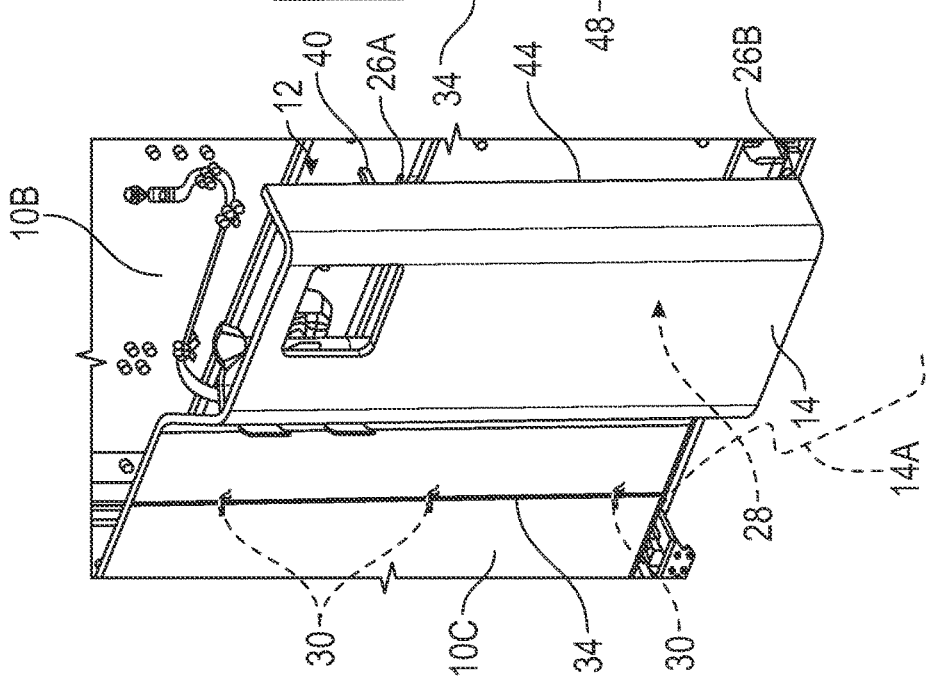
FIG. 5 is a fragmentary perspective view of the compartment structure with the closure panel of FIG. 4 hinged thereto and in a closed position.

Referring to the drawings, wherein like reference numbers refer to like components, FIG. 1 is a fragmentary view of one wall 10A of a compartment structure 10 (also referred to herein as a second structure) and showing a portion of a first embodiment of a latching system 12 for latching a closure panel 14 shown in FIG. 5. The remainder of the latching system 12 is shown in FIG. 5 secured to the closure panel 14 (also referred to herein as a first structure). Stated differently, some components of the latching system 12 are secured to the compartment structure 10 while others are secured to the closure panel 14. In the embodiment shown, the closure panel 14 is an amenity door hinged to the compartment structure 10, which forms a compartment of a vanity such as for an airplane lavatory. It should be appreciated, however, that the latch assemblies as disclosed herein may be used in other applications, such as to close closure panels in nonvehicle and non-aircraft applications. As discussed herein, the latching system 12 includes multiple latch assemblies 16A, 16B (portions of which are shown in FIG. 1) configured to latch independently of one another when the closure panel 14 is moved to a closed position (shown in FIG. 4) and configured to be released (e.g., unlatched) simultaneously. Although only two latch assemblies 16A, 16B are shown (also referred to as a first latch assembly 16A, and a second latch assembly 16B, respectively), the latching system 12 may include more than two latch assemblies. Some components of the latch assemblies 16A, 16B (e.g., latch bodies 20A, 20B, latch pawls 22A, 22B, and latch pawl biasing members 24A, 24B, respectively) are secured relative to the compartment structure 10, while other components of the latch assemblies 16A, 16B (e.g., catches 26A, 26B for the latch pawls 22A, 22B, respectively) are secured relative to the closure panel 14.

With reference to FIGS. 1 and 5, the compartment structure 10 may include multiple walls 10A, 10B, and 10C that, together with the closure panel 14, enclose a compartment 28 (the compartment 28 is disposed behind the closure panel 14 in FIG. 5). The compartment 28 may be an interior space such as to hold a refuse container, cleaning supplies, etc. A lavatory sink (not shown) may be secured to the compartment structure 10 just above a portion of the closure panel 14. FIG. 1 shows one wall 10A of the compartment structure 10 to which portions of the latching system 12 are secured. Additional walls 10B, 10C of the compartment structure 10 are shown in FIG. 5. The wall 10A is removed in FIG. 5 in order to reveal the catches 26A, 26B, and would extend between wall 10B and the portion of the closure panel 14 with the catches 26A, 26B when secured to the wall 10B in FIG. 5.

Figure 7:
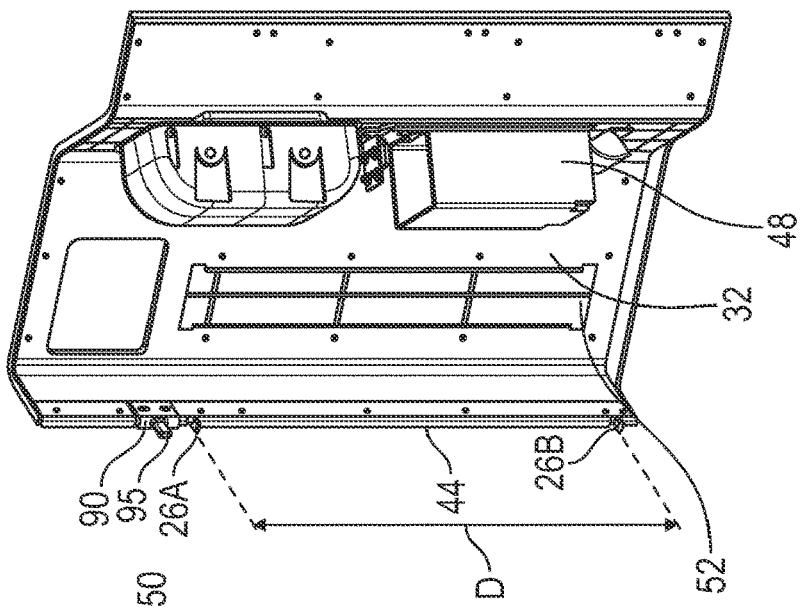
FIG. 7 is a perspective view of an inner side of the closure panel of FIG. 5 showing catches and a guide pin of the latching system secured to the closure panel.
Figure 6:
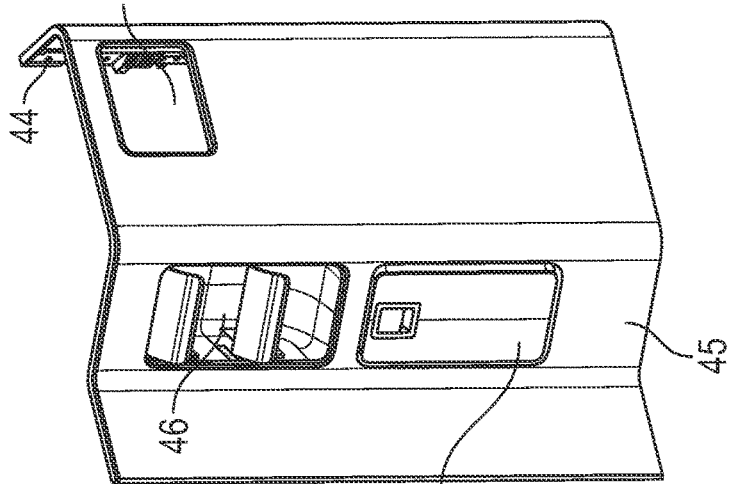
FIG. 6 is a perspective view of an outer side of the closure panel of FIG. 5.

The closure panel 14 is hinged to the wall 10C at hinges 30 (shown in phantom in FIG. 5) at the inner side of the closure panel 14 near edge 34 of the closure panel 14 so that the closure panel 14 pivots about a pivot axis of the hinges 30 from the closed position of FIG. 5 to an open position 14A, represented by a phantom outline of the open position of the lower edge of the closure panel 14. The catches 26A, 26B and an alignment pin 95 supported on a bracket 90 (best shown in FIG. 7) extend from an edge 44 of the closure panel 14 opposite the hinged edge 34. FIG. 6 shows an exterior side 45 of the closure panel 14 with a tissue paper assembly 46 and a tilt out container 48, such as for disposing refuse in the compartment 28. An access opening 50 may be used for disposal of additional refuse into another container in the compartment 28. FIG. 7 shows an interior side 32 of the closure panel 14, with a strengthening panel 52 to impart structural rigidity to the closure panel 14.

In order to access the compartment 28 such as to empty refuse and/or to access lavatory plumbing, airlines personnel periodically unlatch the closure panel 14 to move it to the open position 14A. The latching system 12 enables simultaneous unlatching of the multiple latch assemblies 16A, 16B. Generally, the closure panel 14 is relatively light and may flex or twist under application of a closing force applied at one location, which could cause a latch assembly (16A or 16B) further from the location of the applied closing force not to latch. However, the latch system 12 is configured to enable the latch assemblies 16A, 16B to latch independently from one another, thus allowing the operator to simply press on the closure panel 14 near the unlatched latch assembly to move it to the latched position without needing to first unlatch the latch assembly that did properly latch in response to the initial closing force.

Figure 2:
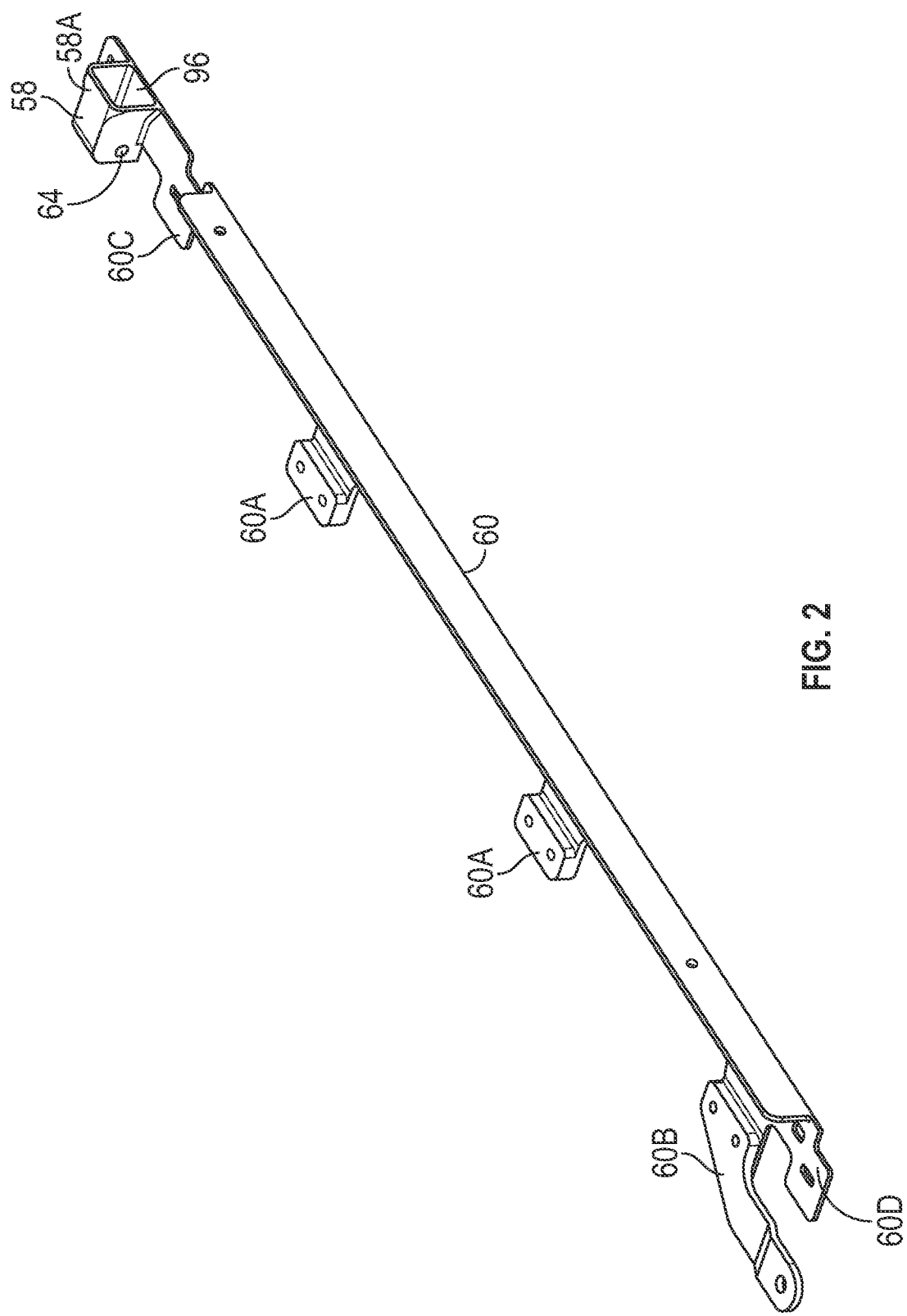
FIG. 2 is a perspective view of a one-piece base included in the latching system of FIG. 1.
Figure 3:
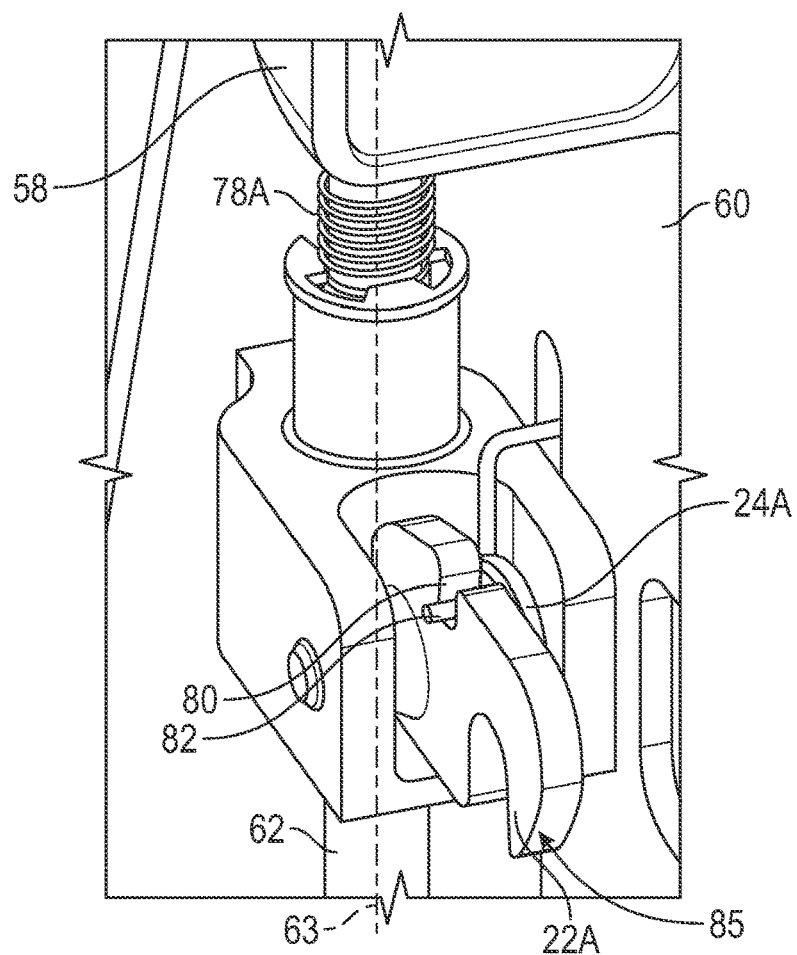
FIG. 3 is a fragmentary view of the compartment structure and the latching system of FIG. 1, showing a first latch body secured to a latch rod and a latch pawl secured to the first latch body.

In particular, and with reference to FIGS. 1-3, the latching system 12 includes the multiple latch assemblies 16A, 16B with respective latch pawls 22A, 22B shown in latched positions, and an actuator 56 and latch rod 62 shown in a rest position. The latch bodies 20A, 20B are spaced apart from one another by a predetermined distance D indicated in FIG. 1. The catches 26A, 26B secured to the closure panel 14 are spaced apart from one another by the same predetermined distance D so that the latch pawl 22A of the first latch assembly 16A latches to the first catch 26A and the latch pawl 22B of the second latch assembly 16B latches to the second catch 26B. The separate biasing members 24A, 24B at each latch pawl 22A, 22B, respectively, enable the latch pawl 22A to pivot independently of the latch pawl 22B, and the latch pawl 22B to pivot independently of the latch pawl 22A, and therefore the latching of the latch pawl 22A to catch 26A to be independent of the latching of the latch pawl 22B to catch 26B as discussed herein.

The latching system 12 also includes a guide body 58 configured to be secured to the compartment structure 10. Specifically, the guide body 58 is integrally formed with a one-piece base 60, best shown in FIG. 2. The base 60 includes a forward wall disposed orthogonally to a side wall, creating an L shape. The base 60 is configured to be secured to the compartment structure 10, as shown secured to the wall 10A at integral brackets 60A, 60B, 60C, and 60D. There are two identical brackets 60A. The brackets 60A and 60B have a thickness that serves as an integral spacer to place the latch rod and latch assemblies 16A, 16B sufficiently away from the wall 10A to allow the latch rod 62 and the latch bodies 20A, 20B fixed thereon to move between respective latched and unlatched positions without interfacing with the wall 10A. The bracket 60B provides the same functionality as an integral spacer for the actuator 56. With reference to FIG. 1, intermediate latch rod retainers 65 are disposed against the brackets 60A, 60B and bolts 67 extend through both the standoff brackets 60A, 60B and the latch rod retainers 65. Bumpers 61 are secured to a forward flange of the base 60 to interface with the closure panel 14 when the closure panel 14 is in a closed position.

The latching system 12 includes a latch rod 62 that has a longitudinal axis 63 (indicated in FIG. 3) that extends parallel with the base 60. Although the longitudinal axis 63 of the latch rod 62 is shown extending vertically in the example embodiments herein, the latch rod 62 could extend in any orientation with the latch assemblies 16A, 16B spaced apart from one another along the longitudinal axis 63. The latch rod 62 is slidably retained by the guide body 58. Stated differently, the latch rod 62 is able to slide along its length (in a direction along the longitudinal axis 63) relative to the guide body 58 and the base 60 when a force is applied to the latch rod 62. More specifically, the guide body 58 has an opening 64 (indicated in FIGS. 2 and 10) through which the latch rod 62 extends. The latch rod 62 can slide up and down in the opening 64 relative to the guide body 58. If a rotational force is applied to the latch rod 62 about the longitudinal axis 63, in order to prevent the latch rod 62 (and the latch bodies 20A, 20B fixed thereto) from rotating about the longitudinal axis 63 (which could cause misalignment of the latch pawls 22A, 22B with the catches 26A, 26B), the integral brackets 60C, 60D interfere with the sides of the latch bodies 20A, 20B should they rotate beyond a minimal amount.

The multiple latch assemblies 16A, 16B are fixed to the latch rod 62 so that, when the latch rod 62 moves in a direction along its longitudinal axis 63, both of the latch bodies 20A, 20B, as well as the latch pawls 22A, 22B and biasing members 24A, 24B supported on the respective latch bodies 20A, 20B, will move in unison with the latch rod 62. As discussed herein, this enables simultaneous release of the latch assemblies 16A, 16B with a single action, such as a force applied to the actuator 56.

As best shown in FIG. 4, the first latch body 20A is fixed to the latch rod 62 between a pair of split rings 70 engaged in a pair of circumferential grooves 72 in the latch rod 62 to retain the latch body 20A in a fixed position along the length of the latch rod 62 (e.g., between the circumferential grooves 72). The circumferential grooves 72 are spaced apart from one another along the latch rod 62 and the latch body 20A is disposed along the latch rod 62 between the pair of circumferential grooves 72. The latch body 20A has an opening 69 extending therethrough, and the shape of the opening 69 sufficiently matches the shape of the outer perimeter of the latch rod 62 so that the latch rod 62 extends therethrough. For example, the opening 69 may be circular, and the outer perimeter of the latch rod 62 where the rod extends through the opening 69 may be circular. A grub screw 74 (see FIG. 4) extends laterally through the first latch body 20A and against the latch rod 62 to further fix the latch body 20A in place along the latch rod 62.

Figure 12:
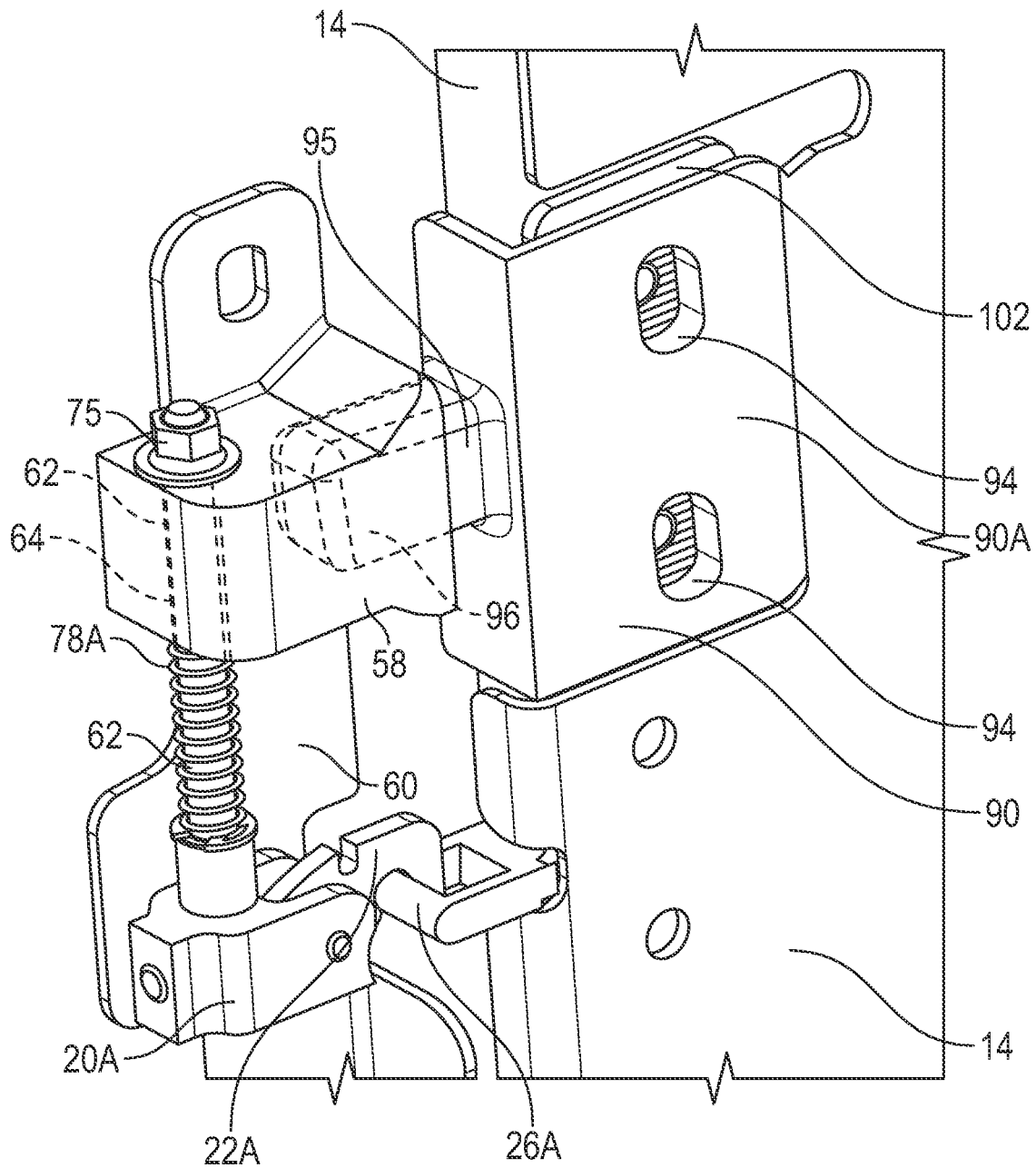
FIG. 12 is a fragmentary perspective view of the closure panel and showing a guide pin extending from a bracket on the closure panel into a guide receptacle of a guide body integral with the base.

As shown in FIGS. 1, 3, and 4, a rod-biasing spring 78A (referred to herein as a first rod-biasing spring) is coaxially arranged on the latch rod 62 and disposed between the guide body 58 and the latch body 20A of the first latch assembly 16A (above the split ring 70). The rod-biasing spring 78A is a compression spring. Washers may also be disposed at either or both ends of the rod-biasing spring 78A. A lock nut 75 is disposed at a first end of the latch rod 62 (e.g., the upper end as shown in FIGS. 1 and 12) which may be threaded to receive the lock nut 75, and with the guide body 58 disposed between the lock nut 75 and the rod biasing spring 78A. The lock nut 75 screws onto the latch rod 62 to a set point and preloads the first rod-biasing spring 78A. The first rod-biasing spring 78A (along with second rod-biasing spring 78B discussed herein) always pushes the latch rod 62 in a direction away from the guide body (e.g., down in FIG. 1) so that when an operator actuates the actuator 56 as discussed herein to push the latch rod 62 and latch bodies 20A, 20B fixed thereon in a direction against the rod-biasing springs 78A, 78B (e.g., upwards in FIG. 1), the rod-biasing springs 78A 78B are being compressed, and once the operator removes the force from the actuator 56, the rod-biasing springs 78A, 78B act to return the latch rod 62 back down to the rest position shown in FIG. 1, in which the latch pawls 22A, 22B align with the catches 26A, 26B.

Figure 8:
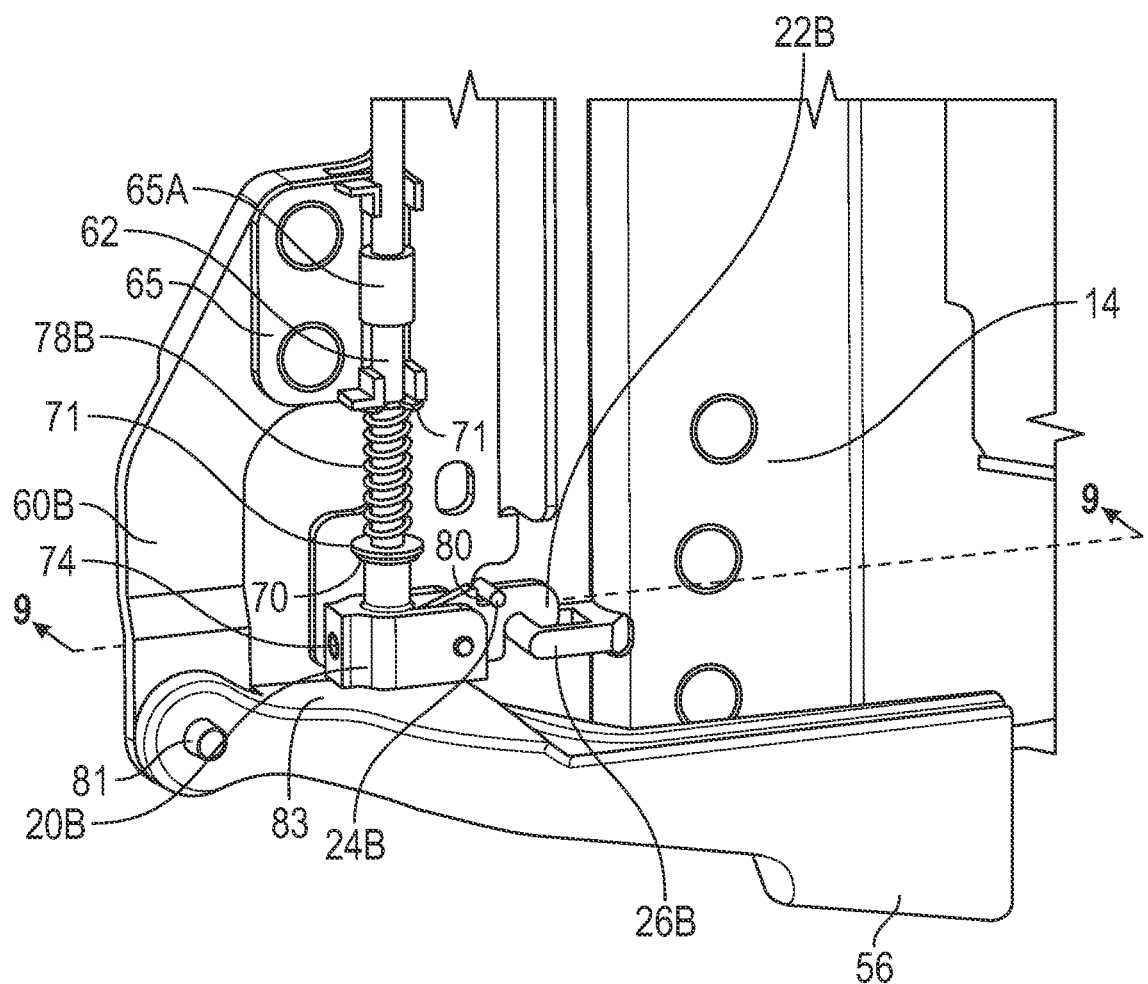
FIG. 8 is a fragmentary view of a lower portion of the latching system of FIG. 1 with the second latch assembly shown in a latched position.
Figure 9:
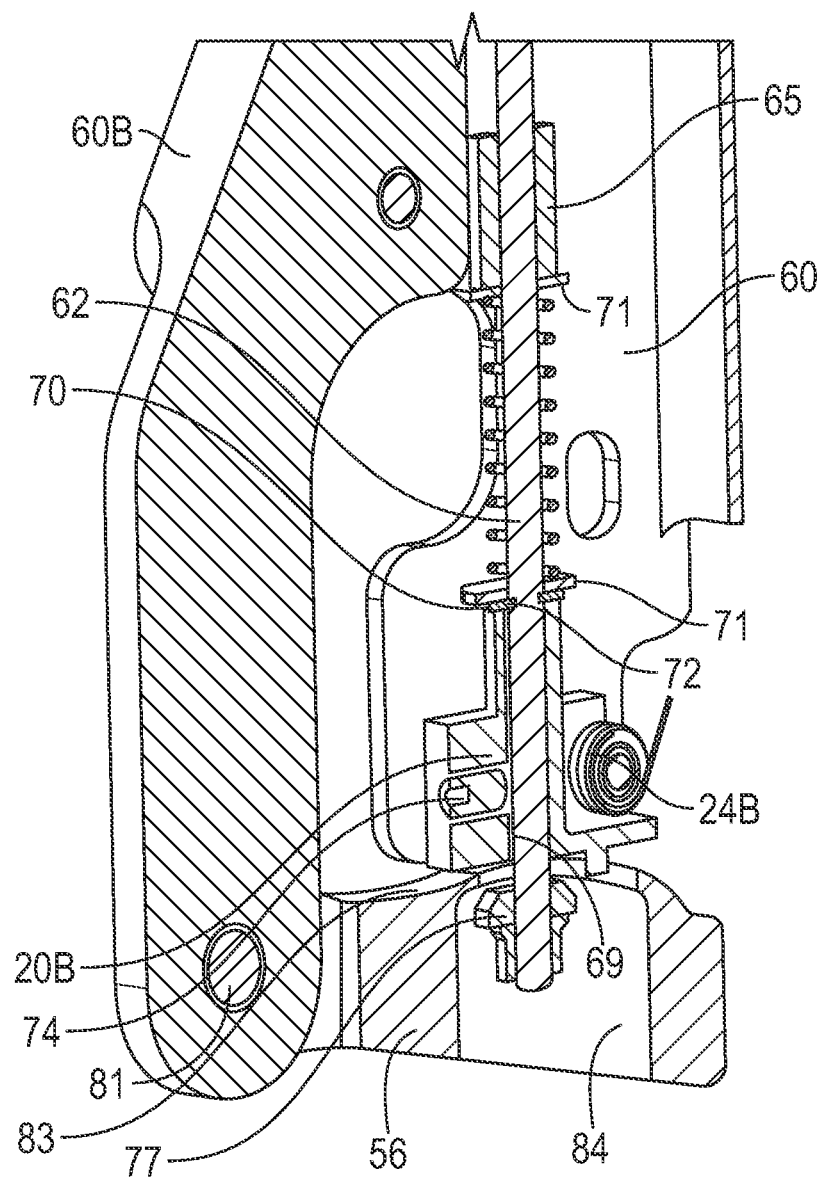
FIG. 9 is a cross-sectional view of the lower portion of the latching system of FIG. 8 taken at lines 9-9 in FIG. 8.

With reference to FIG. 3, the biasing member 24A is a torsion spring shown biasing the first latch pawl 22A to a latched position (shown latched to the first catch 26A in FIG. 4). The biasing member 24B shown in FIGS. 8 and 9 is also a torsion spring and is configured in an identical manner to bias the second latch pawl 22B. As shown, in FIGS. 3 and 4, the latch pawl 22A has a notch 80, and an end 82 of the torsion spring 24A is seated in the notch 80 to bias the latch pawl 22A downward. FIG. 8 shows a similar notch 80 in latch pawl 22B with an end of torsion spring 24B seated in the notch. FIG. 3 shows that the latch pawl 22A has forward curved face 85 that interfaces with the outer surface of the catch 26A before sliding over the catch 26A to latch to the catch 26A. In the event that the latch pawl 22A does not successfully latch when the operator closes the closure panel 14, placing an additional force on the exterior of the closure panel 14 in the vicinity of the catch 26A (e.g., to the exterior side 45 directly outward of the catch 26A, which will cause the catch 26A to move against the curved face 85, which will cause the latch pawl 22A to rotate upward (against the biasing force of the torsion spring 24A) until it slips over the catch 26A and the torsion spring 24A forces it into the latched position. This movement of the latch pawl 22A is independent of any movement of the latch pawl 22B. Accordingly, the latch pawl 22B may remain latched while the latch pawl 22A is corrected to the latched state with an additional force applied in this manner. In an instance where the latch pawl 22A successfully latches but the latch pawl 22B does not latch, an additional force can be applied on the exterior of the closure panel 14 in the vicinity of the catch 26B to cause the latch pawl 22B to slip over the catch 26B in this same manner without affecting the latched state of latch pawl 22A.

With reference to FIGS. 8-9, an additional split ring 70 and a circumferential groove 72 in the latch rod 62 are disposed nearer to the second latch body 20B. A grub screw 74 extends laterally through the second latch body 20B and against the latch rod 62 to further fix the latch body 20B in place along the latch rod 62. The latch rod retainers 65 (see FIG. 1) have guide portions 65A that slidably retain the latch rod 62. Stated differently, while the latch rod retainer 65 remains fixed in position to the wall 10A on the respective standoff brackets 60A, 60B, the latch rod 62 can slide along its longitudinal axis 63 relative to the latch rod retainer 65 in the guide portions 65A.

A rod-biasing spring 78B (referred to herein as a second rod-biasing spring) is disposed between the latch rod retainer 65 on the standoff bracket 60B and the latch body 20B of the second latch assembly 16B (above the split ring 70). Washers 71 are disposed on either side of the rod-biasing spring 78B. The latch body 20B has an opening 69 extending therethrough, and the shape of the opening 69 sufficiently matches the shape of the outer perimeter of the latch rod 62 so that the latch rod 62 extends therethrough. For example, the opening 69 may be circular, and the outer perimeter of the latch rod 62 where the rod extends through the opening 69 may be circular. A lock nut 77 is disposed at and end of the latch rod 62 (e.g., the lower end as shown) with the second latch body 20B disposed between the split ring 70 and the lock nut 77.

Figure 10:
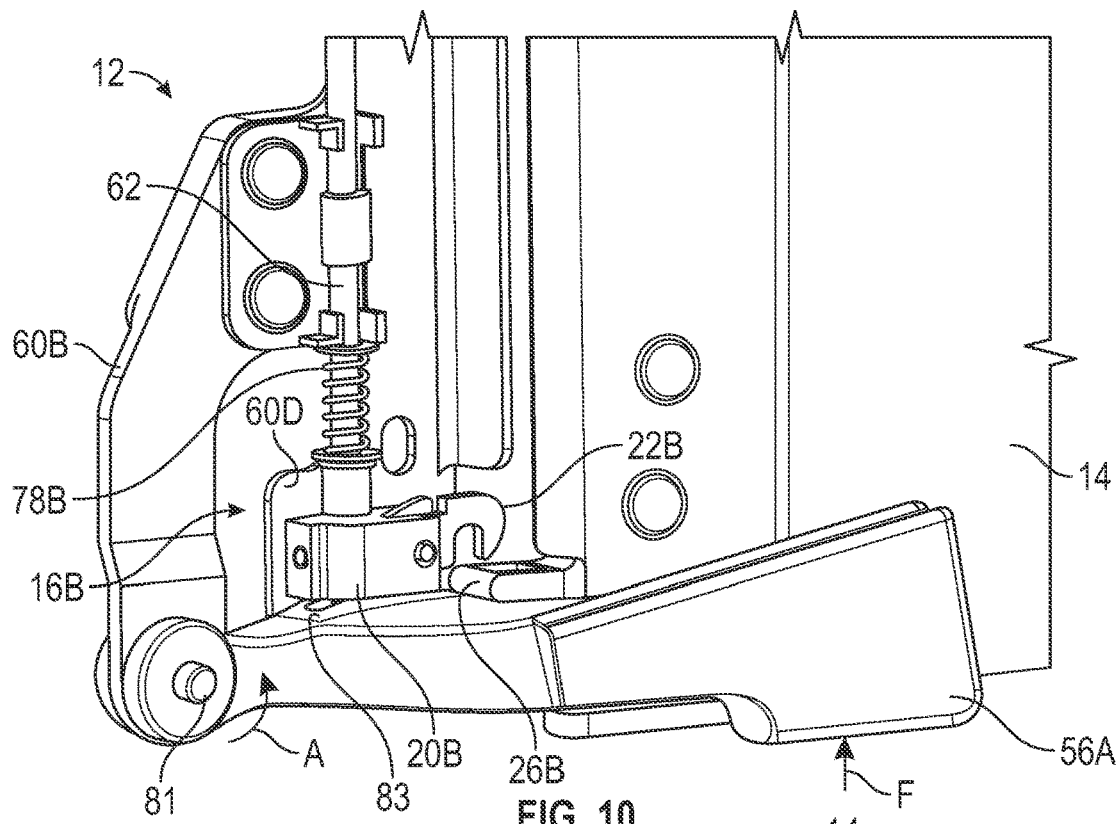
FIG. 10 is a fragmentary view of a portion of the latching system of FIG. 1 with a force applied to actuate an actuator and the second latch assembly shown in an unlatched position.

In FIGS. 8 and 9, the actuator 56 is a lever that is secured to the bracket 60B with a lever hinge pin 81. The cross-section of FIG. 9 is behind the closure panel 14, the latch pawl 22B, and the catch 26B in FIG. 8, as these do not appear in FIG. 9. In FIGS. 8 and 9, the lever 56 is not actuated and the latch rod 62 is in a rest position. Referring to FIG. 10, in response to a force F applied on the lever 56, the lever pivots in the direction of arrow A about an axis through the hinge pin 81 to an actuated position 56A. Because a top surface 83 of the lever 56 rests against a bottom of the latch body 20B, pivoting of the lever 56 by the force F causes the latch body 20B and the latch rod 62 secured thereto to move to an actuated position, causing the latch pawl 22B to lift with the latch body 20B and unlatch from the catch 26B. The movement of the latch rod 62 upon actuation of the lever 56 acts against the rod-biasing spring 78B, so that latch body 20B and latch pawl 22B secured thereto return to the latched position of FIG. 8 when the force F is removed. Of course, if the operator has moved the closure panel 14 to open it while the lever 56 was depressed to the position of 56A, then the catch 26B will have moved away with the closure panel 14. The lever 56 has a slot 84 (shown in FIG. 9) through which the latch rod 62 extends, allowing the latch rod 62 to move along its longitudinal axis as the lever 56 pivots. In FIG. 8, the slot 84, as well as the end of the latch rod 62, and the lock nut 77 are blocked from view by the interfacing latch body 20B and lever 56. Additionally, the top surface 83 is convex at the opening of the slot 84, creating a slight gap between the surface 83 and the relatively straight bottom of the latch body 20B further outward from the slot 84 so that the lever 56 is not locked against the bottom of the latch body 20B when the lock nut 77 is tightened.

Figure 11:
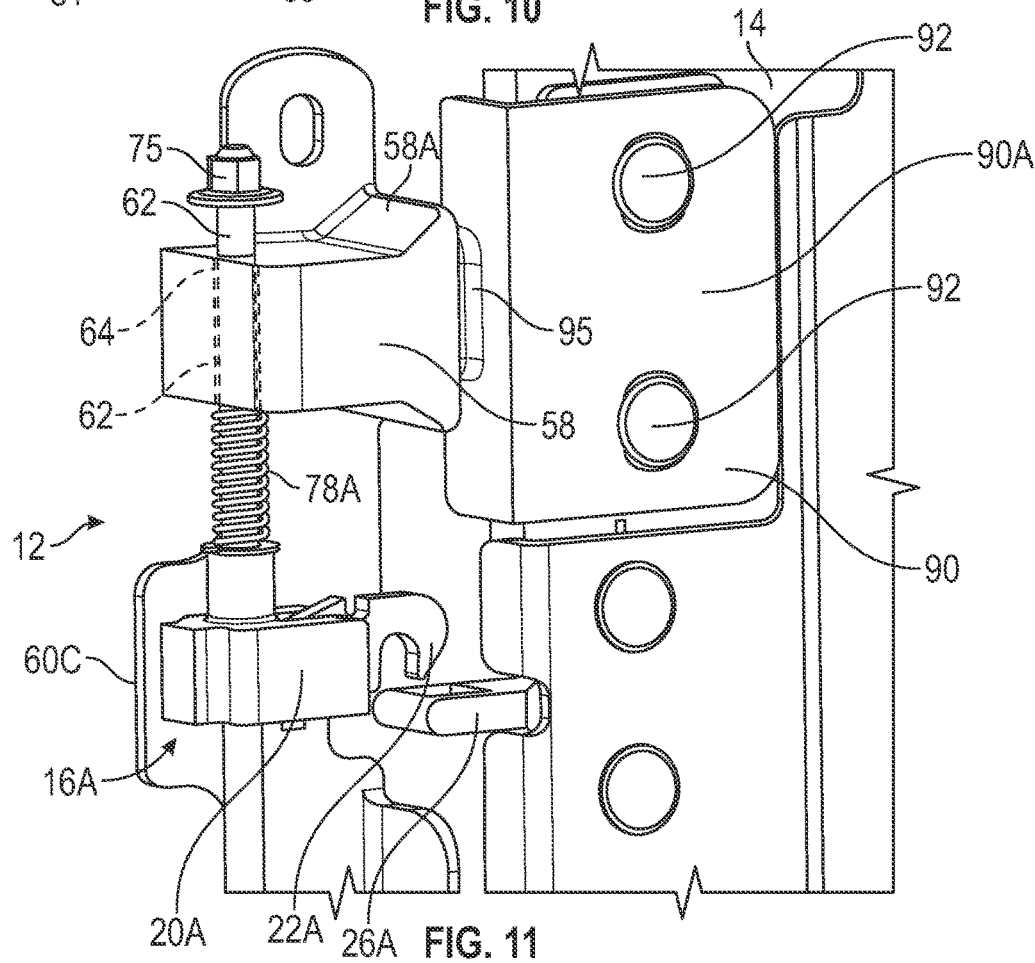
FIG. 11 is a fragmentary view of another portion of the latching system of FIG. 1 with the first latch assembly in an unlatched position due to the force applied to the actuator in FIG. 10.

FIG. 11 is a fragmentary view of a portion of the latching system 12 of FIG. 1 with the first latch assembly 16A in an unlatched position. The latch body 20A moves upward with the latch rod 62, moving the latch pawl 22A to the unlatched position (unlatched from catch 26A) simultaneously as the second latch assembly 16B moves to the unlatched position due to the force applied to the actuator 56 in FIG. 10. As shown in FIG. 11, the latch rod 62 slides upward in the opening 64 through the guide body 58 relative to its rest position in FIGS. 1 and 12 (in which the force F is not applied to the actuator 56) and the lock nut 75 lifts with the latch rod 62 away from the guide body 58.

Figure 13:
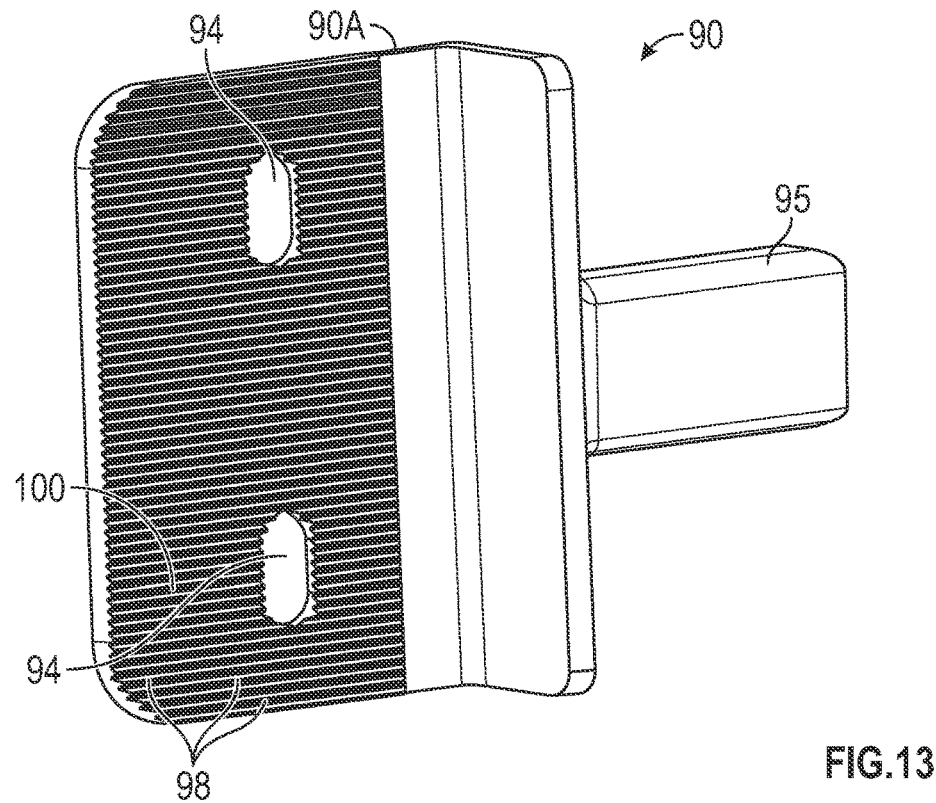
FIG. 13 is a perspective view of the bracket of FIG. 12 showing a serrated inner face.
Figure 14:
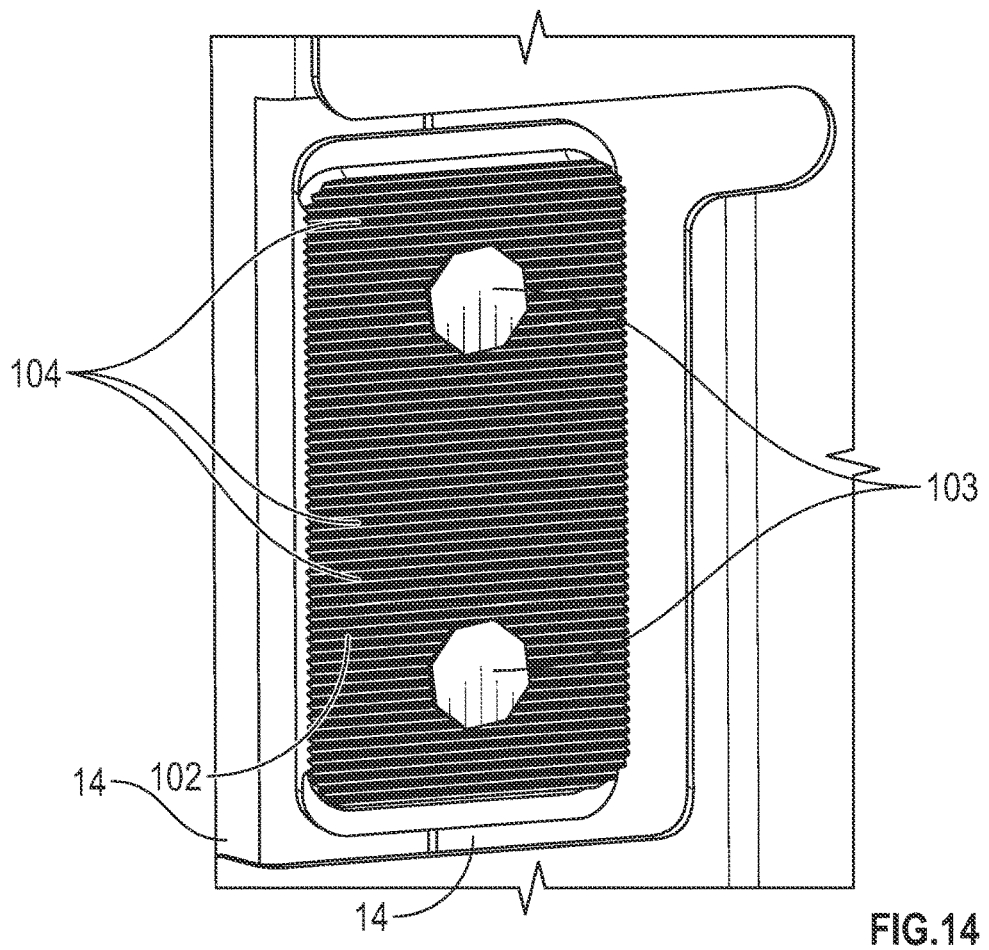
FIG. 14 is a fragmentary perspective view of the closure panel with the bracket of FIG. 12 removed to show a serrated plate secured to the closure panel.

FIG. 11 shows a bracket 90 having a body 90A secured to the closure panel 14 with set screws 92. In FIG. 12, the set screws 92 are not shown to reveal elongated slots 94 through the body 90A and in which the set screws 92 extend in FIG. 11. Although two elongated slots 94 are shown, in some embodiments, only one slot 94 and one set screw 92 may be used. The bracket 90 includes a guide pin 95 configured to extend outward from the body 90A. A portion of the guide body 58 is configured as a guide receptacle 58A that forms a channel 96 (best shown in FIG. 2) so that the guide body 58 integrally forms and serves as the guide receptacle 58A, with the channel 96 receiving the guide pin 95, as shown in FIG. 12, to establish a relative orientation of the closure panel 14 and the wall 10A of the compartment structure 10 in the direction along the longitudinal axis of the latch rod 62. As best shown in FIG. 13, a plurality of first serrations 98 are disposed at an inner side 100 of the bracket 90. FIG. 14 shows a serrated plate 102 configured to secure to the closure panel 14 with screws 103. The plate 102 is partially visible in FIG. 12 also. The plate 102 has a plurality of second serrations 104 configured to interlock with the plurality of first serrations 98. Accordingly, the relative orientation of the closure panel 14 and the compartment structure 10 (specifically wall 10A) is adjustable along a length of the elongated slots 94 by engaging the first serrations 98 with the second serrations 104 at a different relative orientations and then tightening the set screws 92. Production tolerances, sag of the closure panel 14 with use, etc., may necessitate adjusting the relative positions of the guide pin 95 to the channel 96 of the guide receptacle 58A formed by the guide body 58 via an adjustment of the bracket 90 on the plate 102.

Figure 15:
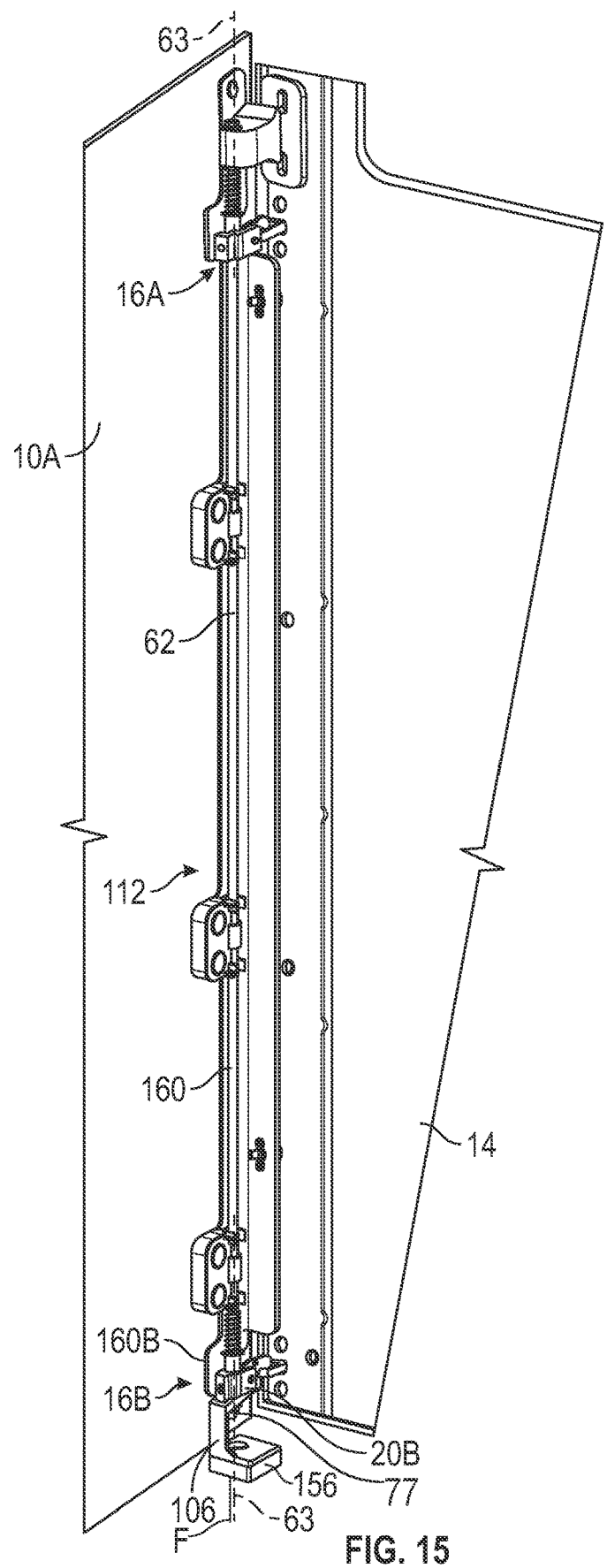
FIG. 15 is a fragmentary view of the compartment structure and closure panel showing a portion of a second embodiment of a latching system with multiple latch assemblies in a latched position and an actuator shown in a rest position.

FIG. 15 is a fragmentary view of a portion of the wall 10A showing a portion of a second embodiment of a latching system 112. The latching system 112 is identical to latching system 12 except that a one-piece base 160 parallel with the latch rod 62 has a different integral bracket 160B in place of integral bracket 60B and a different actuator 156 is secured to the latch rod 62 by a bracket 106. The latch rod 62 extends through an opening in the bracket 106 and the bracket 106 is sandwiched between the bottom of the latch body 20B and the lock nut 77. The actuator 156 is a push pad, and may be referred to as a push button and is shown in a rest position. Rather than a pivotable lever, the actuator 156 moves only in a direction along the longitudinal axis 63 with the latch rod 162, and is actuated by a force F pushing directly upward on the bottom of the actuator 156. The actuator 156 and bracket 106 are also used with the latching system 212 of FIG. 16, and are shown and described in greater detail in FIG. 21 with respect to latching system 212.

Figure 16:
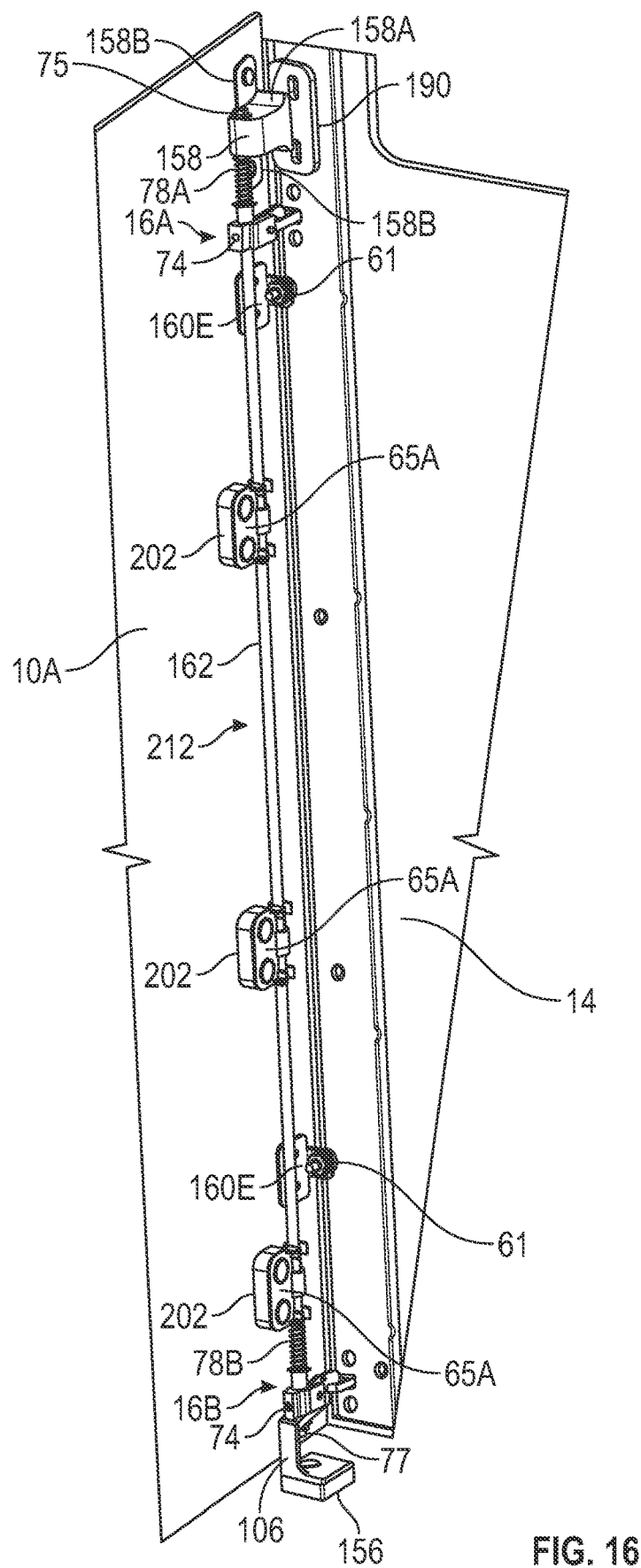
FIG. 16 is a fragmentary view of the compartment structure and closure panel showing a portion of a third embodiment of a latching system with multiple latch assemblies in a latched position and an actuator shown in a rest position.
Figure 20:
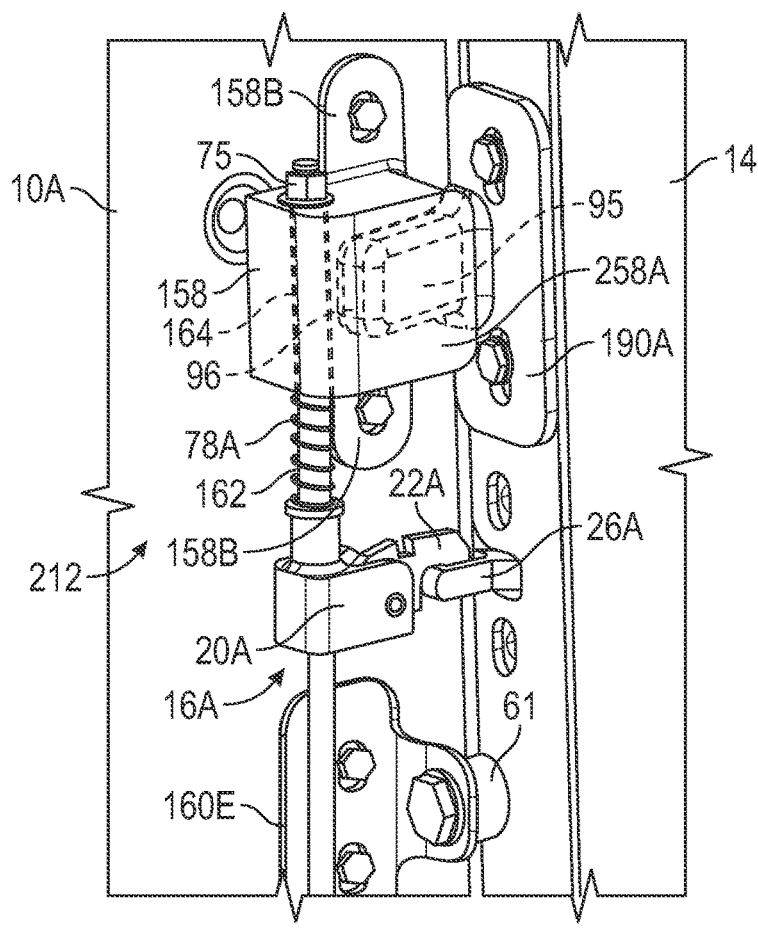
FIG. 20 is a fragmentary view of an upper portion of the compartment structure, the closure panel, and the latching system of FIG. 16, showing a guide component with a different guide receptacle than shown in FIG. 16 secured to the compartment structure aligned with a guide pin extending from a bracket on the closure panel and showing a first latch assembly in a latched position.
Figure 22:
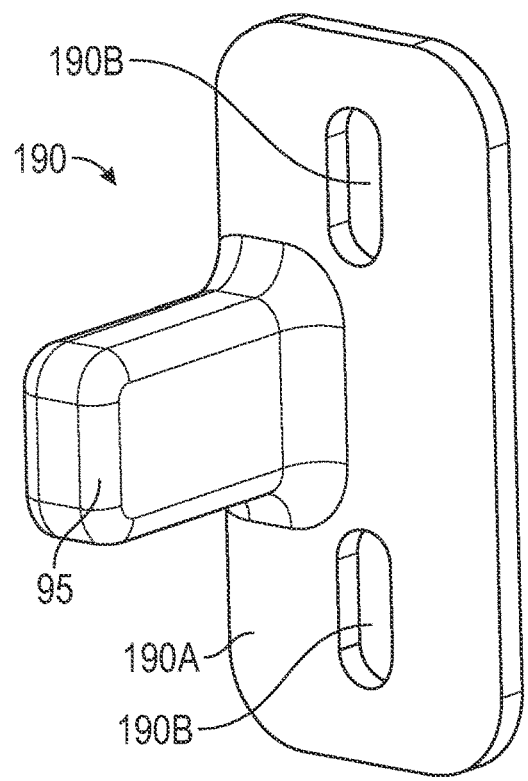
FIG. 22 is a perspective view of the bracket with the guide pin included in the latching system of FIG. 16.
Figure 23:
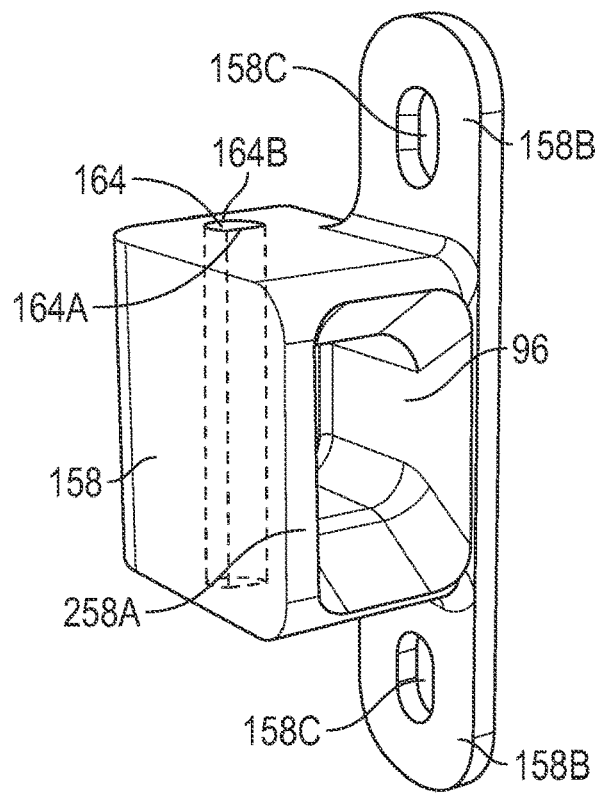
FIG. 23 is a perspective view of the guide body with the guide receptacle of FIG. 20 included in the latching system of FIG. 16.

FIG. 16 is a fragmentary view of a portion of the wall 10A showing a third embodiment of a latching system 212 with the multiple latch assemblies 16A, 16B in a latched position and an actuator 156 shown in a rest position. The latching system 212 has the same components as latching system 112 except that, as described herein, the latch rod 162 is different than the latch rod 62, and no base 160 is provided so that there are more individual brackets or flanges provided for securing the components of the latching system 212 to the wall 10A or the closure panel 14. Additionally, in place of the relatively thick integral brackets 60A, 60B, individual spacers 202 are disposed between each of the latch rod retainers 65 and the wall 10A. Individual brackets 160E mount the bumpers 61 to the wall 10A. Additionally, because there is no integral base, a guide body 158 is provided that has flanges 158B to mount it to the wall 10A. The guide body 158 forms the guide receptacle 258A at channel 96, as shown in FIG. 23, similar to guide body 58 of FIG. 2. Instead of bracket 90 with the serrated inner side, a bracket 190 shown in FIG. 22 is secured to the closure panel 14, as shown in FIG. 16. The bracket 190 has the guide pin 95 configured to extend outward from the body 190A of the bracket 190. Notably, the openings 190B in the bracket 190 are elongated slots to enable some vertical adjustment of the guide pin 95 relative to the channel 96, if necessary. Similarly, openings 158C in the flanges 158B of the guide body 158 are elongated slots for the same reason. A portion of the guide body 158 is a guide receptacle 258A that forms the channel 96 so that the guide body 158 integrally forms and serves as the guide receptacle 258A, with the channel 96 receiving the guide pin 95, as shown in FIG. 20, to establish a relative orientation of the closure panel 14 and the wall 10A in the direction along the longitudinal axis 63 of the latch rod 162.

Figure 17:
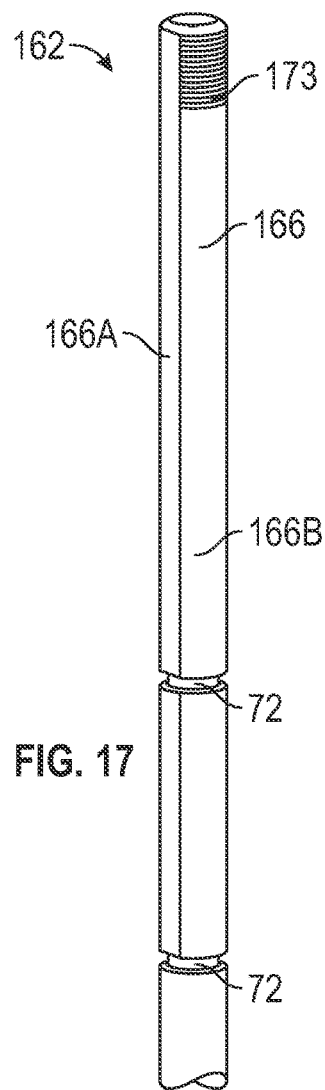
FIG. 17 is a fragmentary perspective view of a top portion of the latch rod of the latching system of FIG. 16.
Figure 18:
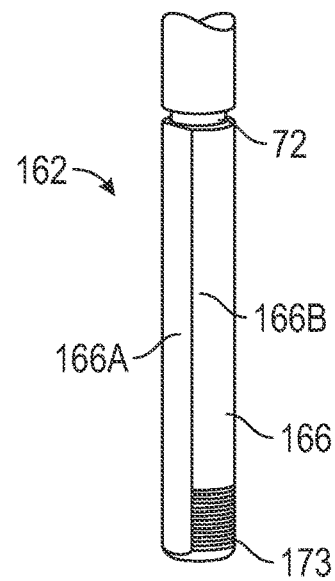
FIG. 18 is a fragmentary perspective view of a bottom portion of the latch rod of the latching system of FIG. 16.

FIG. 17 is a fragmentary perspective view of a top portion of the latch rod 162 of the latching system 212 of FIG. 16, and FIG. 18 is a fragmentary perspective view of a bottom portion of the latch rod 162. FIG. 17 shows that the latch rod 162 has the same grooves 72 as discussed with respect to latch rod 62 of FIG. 4 for retaining the first latch body 20A in an axial position along the length of the latch rod 162. FIG. 18 shows that the latch rod 162 has a groove 72 similarly as discussed with respect to latch rod 62 in FIG. 9 for retaining the second latch body 20B in an axial position along the length of the latch rod 162. The respective top and bottom ends of the latch rod 162 are shown as threaded at threads 173 to retain the lock nuts 75, 77, respectively. A grub screw 74 extends through the first latch body 20A and a grub screw 74 extends through the second latch body 20B to further hold the latch bodies 20A, 20B in a fixed axial position with respect to the latch rod 162, as discussed with respect to the grub screws 74 used to secure the latch bodies 20A, 20B to the latch rod 62 in the latching system 12.

Because there is no guide with brackets 60C, 60D to prevent rotation of the latch bodies 20A, 20B about the longitudinal axis 63 of the latch rod 162, the latch rod 162 is instead specifically configured to prevent such rotation. More specifically, FIG. 17 shows that the top portion of the latch rod 162 has a non-circular perimeter 166 where the latch rod 162 slides through an opening 164 the guide body 158 (see FIGS. 20 and 23), and FIG. 18 shows that a bottom portion of the latch rod 162 also has a non-circular perimeter 166 where the latch rod 162 is disposed through an opening 169 in the latch body 20B (see FIG. 21). The non-circular perimeter 166 at both the top portion and the bottom portion of the latch rod 162 includes a flat side 166A and a remaining portion 166B that is a segment of a circle. The opening 164 in the guide body 158 has a like shape (e.g., a flat side 164A and a remaining portion 164B that is a segment of a circle, as indicated in FIG. 23. The opening 169 in the latch body 20B also has shape with a flat side and a remaining portion that is a segment of a circle. If a rotational force is applied to the latch rod 162 to urge it to rotate about the longitudinal axis 63, the shape of the opening 164 will interfere with the non-circular perimeter 166 of the latch rod 162 to limit rotation of the latch rod 162 about the longitudinal axis 63. For example, the guide body 158 at the flat side 164A of the opening 164 will interfere with a corner of the latch rod 162 at the intersection of the flat side 166A and the flat side 164A when the latch rod 162 is urged to rotate. The latch rod 162 will likewise interfere with the latch body 20B at the opening 169 if a rotational force is applied.

Figure 19:
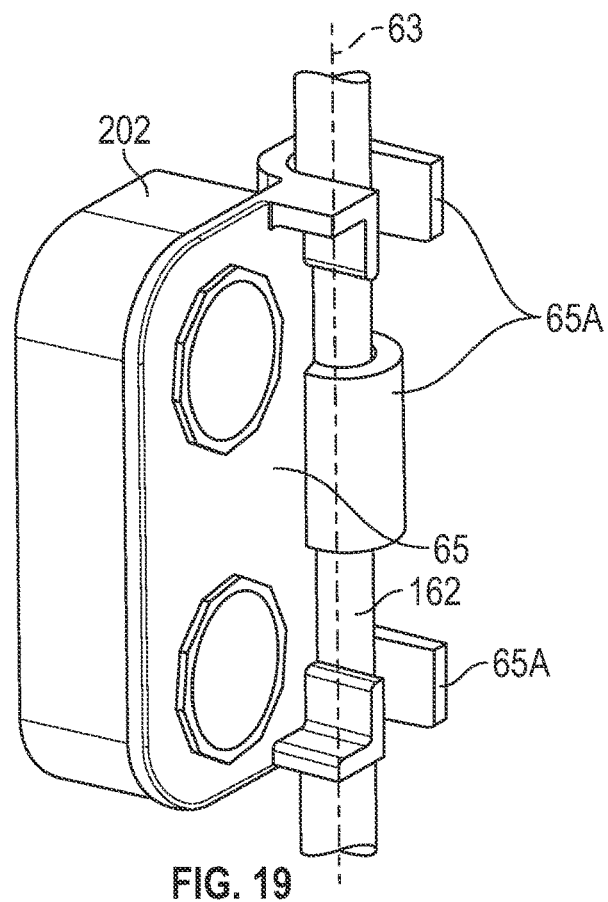
FIG. 19 is a fragmentary perspective view of a portion of the latching system of FIG. 16 showing an intermediate latch rod retainer retaining the latch rod of the latching system of FIG. 16, and a spacer secured to the intermediate latch rod retainer.

FIG. 19 is a fragmentary perspective view of a portion of the latching system 212 of FIG. 16 showing an intermediate latch rod retainer 65 retaining the latch rod 162 and the spacer 202 secured to the intermediate latch rod retainer 65.

FIG. 20 is a fragmentary view of an upper portion of the wall 10A, the closure panel 14, and the latching system 212, showing the guide body 158 secured to the wall 10A at the flanges 158B, and having a portion that is a guide receptacle 258A with a slightly different shape than guide receptacle 158A aligned with the guide pin 95 extending from the bracket 190 on the closure panel 14 into the channel 96. The first latch assembly 16A is shown in a latched position.

Figure 21:
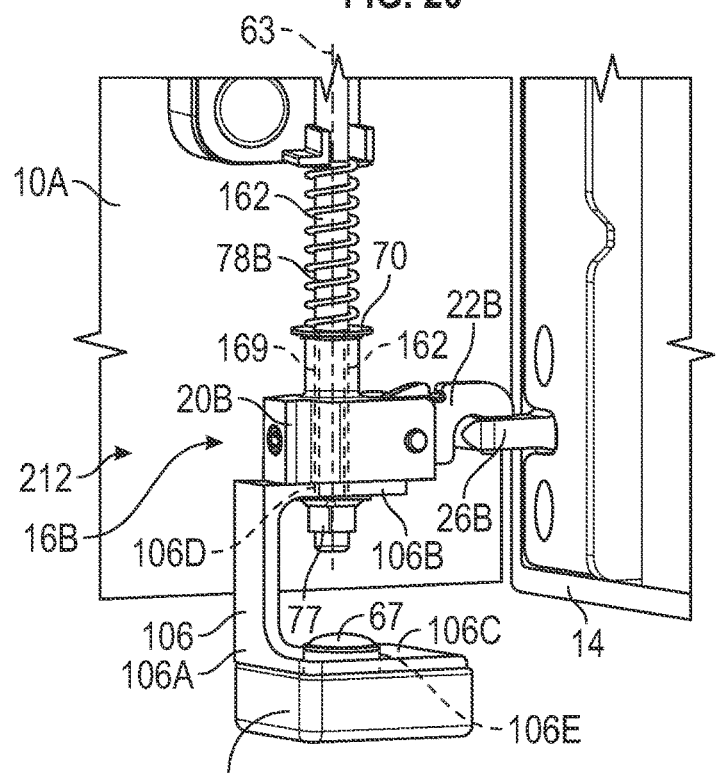
FIG. 21 is a fragmentary view of a lower portion of the compartment structure, the closure panel, and the latching system of FIG. 16, showing a second latch assembly in a latch position and an actuator secured to a bracket attached to the latch rod.

FIG. 21 is a fragmentary view of a lower portion of the wall 10A, the closure panel 14, and the latching system 212, showing the second latch assembly 16B in a latched position and the actuator 156 secured to the bracket 106. Specifically, the bracket 106 includes a leg 106A extending in the same direction as the longitudinal axis 63 of the latch rod 162, a first flange 106B extending from the leg 106A, and a second flange 106C extending from the leg 106A and spaced apart from the second flange 106C. The first flange 106B has an opening 106D through which the lower end of the latch rod 162 extends so that the lock nut 77 can be threaded to the end of the latch rod 162 to retain the bracket 106 against the lower side of the latch body 20B. The flange 106C also has an opening 106E. A bolt 67 extends through the opening 106E to secure the actuator 156 to the bracket 106. Accordingly, when an actuating force is applied to the actuator 156 in an upward direction along the longitudinal axis 63, the actuator 156, the bracket 106, and the latch body 20B will move together in unison with the latch rod 162, and the pawls 22A, 22B will simultaneously unlatch from the respective catches 26A, 26B as the latch body 20A will also lift in unison with the latch rod 162. The lock nut 75 of FIG. 20 will lift away from the guide body 158 as the latch rod 162 slides upward through the opening 164 in the guide body 158.

Accordingly, the various latching systems disclosed herein enable independent latching of multiple latch assemblies while enabling simultaneous release of the latch assemblies, and offer other features as described herein for efficient and repeatable latching and unlatching of a closure panel to a compartment structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A latching system for latching a first structure to a second structure, the latching system comprising:
    a guide body configured to be secured to the second structure;
    a latch rod slidably retained by the guide body;
    multiple latch assemblies fixed to the latch rod, spaced apart from one another, and independently biased to a latched position;
    a first rod-biasing spring coaxial with the latch rod and disposed between the guide body and a first of the latch assemblies;
    multiple catches securable to the first structure and spaced apart from one another at a spacing equal to a spacing of the multiple latch assemblies such that the latch assemblies latch to the catches independently of one another;
    wherein a force on the latch rod along a longitudinal axis of the latch rod in a direction against the first rod-biasing spring moves the latch rod along the longitudinal axis of the latch rod from a rest position to an actuated position and unlatches the multiple latch assemblies simultaneously; and
    a lock nut secured to the latch rod adjacent to the first of the latch assemblies and preloading the first rod-biasing spring to bias the latch rod to the rest position, the latch rod returning to the rest position when the force on the latch rod is removed.

2. The latching system of claim 1, further comprising:
    an actuator disposed adjacent to the latch rod and adapted to receive the force to move the latch rod along the longitudinal axis of the latch rod against the first rod-biasing spring from the rest position to the actuated position.

3. The latching system of claim 2, further comprising:
    a bracket secured to the actuator;
    an additional lock nut secured to the latch rod adjacent to a second of the latch assemblies; wherein the latch rod extends through the bracket between the second of the latch assemblies and the additional lock nut.

4. The latching system of claim 2, wherein:
    the actuator is a lever with a slot;
    the latch rod extends through the slot;
    a latch body of one of the latch assemblies is disposed adjacent to the lever; and the lever is pivotable to apply the force to the latch rod via the lever pushing against the latch body to move the latch rod to the actuated position.

5. The latching system of claim 1, wherein the latch rod is configured with a pair of circumferential grooves spaced apart from one another along the latch rod, the first of the latch assemblies is disposed along the latch rod between the pair of circumferential grooves, and the latching system further comprising:
a pair of split rings engaged in the pair of circumferential grooves to retain a latch body of the first of the latch assemblies to the latch rod between the circumferential grooves on to the latch rod; and
a screw extending through the latch body against the latch rod to further retain the latch body to the latch rod.

6. The latching system of claim 1, wherein:
at least a portion of the latch rod has a non-circular perimeter; and
the guide body has an opening through which the latch rod extends, the opening having a shape that interferes with the non-circular perimeter of the latch rod upon a rotational force applied to the latch rod to limit rotation of the latch rod about the longitudinal axis of the latch rod.

7. The latching system of claim 1, further comprising:
a second rod-biasing spring coaxial with the latch rod and acting against a second of the latch assemblies.

8. The latching system of claim 7, wherein the latch rod is configured with a circumferential groove, and the latching system further comprising:
a latch rod retainer slidably retaining the latch rod; wherein the second rod-biasing spring is disposed between the latch rod retainer and a latch body of the second of the latch assemblies;
a split ring disposed in the circumferential groove between the second rod-biasing spring and the latch body of the second of the latch assemblies;
a screw extending through the latch body of the second of the latch assemblies and against the latch rod to further retain the latch body of the second of the latch assemblies to the latch rod; and
an additional lock nut disposed on the latch rod with the latch body of the second of the latch assemblies between the split ring and the additional lock nut.

9. The latching system of claim 1, further comprising:
a base extending parallel with the latch rod and configured to be secured to the second structure; wherein the guide body is integral with the base.

10. The latching system of claim 9, wherein:
the base interferes with inner sides of the multiple latch assemblies upon a rotational force applied to the latch rod to limit rotation of the latch rod about the longitudinal axis of the latch rod.

11. The latching system of claim 1, wherein each of the latch assemblies includes:
a latch body fixed to the latch rod;
a latch pawl connected to the latch body and pivotable relative to the latch body between a latched position and an unlatched position, the latch pawl of each of the latch assemblies pivotable independently of the latch pawl of each other latch assembly; and
a biasing member biasing the latch pawl to the latched position.

12. The latching system of claim 11, wherein:
the biasing member biasing the latch pawl to the latched position is a torsion spring;
the latch pawl has a notch; and
an end of torsion spring is seated in the notch.

13. The latching system of claim 1, further comprising:
a bracket having a body securable to the first structure, and having a guide pin configured to extend outward from the body of the bracket;
a guide receptacle configured to receive the guide pin to establish a relative orientation of the first structure and the second structure in the direction along the longitudinal axis of the latch rod.

14. The latching system of claim 13, wherein the guide receptacle is integral with the guide body.

15. The latching system of claim 13, wherein the bracket has an elongated slot extending therethrough, and a plurality of first serrations are disposed at an inner side of the bracket; and the latching system further comprising:
a serrated plate configured to secure to the first structure and having a plurality of second serrations configured to interlock with the plurality of first serrations; and
a set screw configured to extend through the elongated slot to the serrated plate;
wherein the relative orientation of the first structure and the second structure is adjustable along a length of the elongated slot by engaging the first serrations with the second serrations at different relative orientations; and
wherein the relative orientation of the first structure and the second structure is set by tightening the set screw against the serrated plate.

16. A latching system for latching a closure panel to a compartment structure, the latching system comprising:
a guide body configured to be secured to the compartment structure;
a latch rod slidably retained by the guide body;
a first latch assembly and a second latch assembly, each of the latch assemblies including:
a latch body fixed to the latch rod, the latch body of the first latch assembly spaced apart from the latch body of the second latch assembly along a length of the latch rod by a predetermined distance;
a latch pawl connected to the latch body and pivotable relative to the latch body between a latched position and an unlatched position, the latch pawl of the first latch assembly pivotable independently of the latch pawl of the second latch assembly;
a biasing member biasing the latch pawl to the latched position;
a first rod-biasing spring coaxial with the latch rod and disposed between the guide body and the latch body of the first latch assembly;
a second rod-biasing spring coaxial with the latch rod and biased against the latch body of the second latch assembly;
a first catch and a second catch configured to be secured to the closure panel and spaced apart from one another by the predetermined distance such that the latch pawl of the first latch assembly latches to the first catch and the latch pawl of the second latch assembly latches to the second catch independently of the latch pawl of the first latch assembly latching to the first catch;
wherein movement of the latch rod along a longitudinal axis of the latch rod in a direction against the first rod-biasing spring and the second rod biasing spring moves the latch body of the first latch assembly and the latch body of the second latch assembly with the latch rod to unlatch both the latch pawl of the first latch assembly and the latch pawl of the second latch assembly simultaneously;

an actuator disposed adjacent to the latch rod and adapted to receive a force to move the latch rod along the longitudinal axis of the latch rod against the first rod-biasing spring from a rest position to an actuated position; and a lock nut secured to the latch rod adjacent to the first latch assembly and preloading the first rod-biasing spring to bias the latch rod to a rest position, the latch rod returning to the rest position when the force on the latch rod is removed.

17. The latching system of claim 16, further comprising:

a base extending parallel with the latch rod and configured to be secured to the compartment structure; wherein the guide body is integral with the base; and a bracket having a body securable to the closure panel, and having a guide pin configured to extend outward from the body of the bracket;

wherein the guide body forms a guide receptacle configured to receive the guide pin to establish a relative orientation of the closure panel and the compartment structure in the direction along the longitudinal axis of the latch rod.

18. A latching system for latching a first structure to a second structure, the latching system comprising:

a guide body configured to be secured to the second structure;

a latch rod slidably retained by the guide body;

multiple latch assemblies fixed to the latch rod, spaced apart from one another, and independently biased to a latched position;

a first rod-biasing spring coaxial with the latch rod and disposed between the guide body and a first of the latch assemblies;

multiple catches securable to the first structure and spaced apart from one another at a spacing equal to a spacing of the multiple latch assemblies such that the latch assemblies latch to the catches independently of one another;

wherein a force on the latch rod along a longitudinal axis of the latch rod in a direction against the first rod-biasing spring moves the latch rod along the longitudinal axis of the latch rod from a rest position to an actuated position and unlatches the multiple latch assemblies simultaneously;

wherein the latch rod is configured with a pair of circumferential grooves spaced apart from one another along the latch rod, the first of the latch assemblies is disposed along the latch rod between the pair of circumferential grooves, and the latching system further comprising:

a pair of split rings engaged in the pair of circumferential grooves to retain a latch body of the first of the latch assemblies to the latch rod between the circumferential grooves on to the latch rod; and a screw extending through the latch body against the latch rod to further retain the latch body to the latch rod.

19. The latching system of claim 18, further comprising:

an actuator disposed adjacent to the latch rod and adapted to receive the force to move the latch rod along the longitudinal axis of the latch rod against the first rod-biasing spring from the rest position to the actuated position.

20. The latching system of claim 18, wherein:

at least a portion of the latch rod has a non-circular perimeter; and the guide body has an opening through which the latch rod extends, the opening having a shape that interferes with the non-circular perimeter of the latch rod upon a rotational force applied to the latch rod to limit rotation of the latch rod about the longitudinal axis of the latch rod.

* * * * *